(12) United States Patent
Martin et al.

(10) Patent No.: US 8,705,365 B1
(45) Date of Patent: Apr. 22, 2014

(54) SYSTEM AND METHOD FOR PRODUCING DYNAMIC CREDIT UPDATES FOR TIME BASED PACKET SAMPLING

(75) Inventors: Stacy L. Martin, Fremont, CA (US); Zachariah Cherian, Cupertino, CA (US); Eric T. Chao, Santa Clara, CA (US); Dipankar Bhatt Acharya, Saratoga, CA (US); Neal K. Gokli, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 197 days.

(21) Appl. No.: 13/401,204

(22) Filed: Feb. 21, 2012

(51) Int. Cl.
*H04L 12/28* (2006.01)
*H04J 1/16* (2006.01)
*G06F 12/02* (2006.01)
*H04L 12/56* (2006.01)

(52) U.S. Cl.
CPC ............ H04L 47/10 (2013.01); H04L 47/2441 (2013.01); *H04L 47/30* (2013.01)
USPC ..................... 370/235; 370/232; 370/395.41

(58) Field of Classification Search
CPC ..... H04L 47/10; H04L 47/2441; H04L 47/30; H04L 69/12
USPC ........... 370/229, 230.1, 232, 235, 235.1, 252, 370/395.41, 412, 429; 379/112.1, 112.04, 379/133; 709/224–238
See application file for complete search history.

(56) References Cited

U.S. PATENT DOCUMENTS

| | | | | |
|---|---|---|---|---|
| 7,630,312 | B1 * | 12/2009 | Cheriton | 370/235 |
| 2003/0227872 | A1 * | 12/2003 | Tundlam et al. | 370/232 |
| 2005/0190695 | A1 * | 9/2005 | Phaal | 370/229 |
| 2010/0097945 | A1 * | 4/2010 | Raftelis et al. | 370/252 |
| 2012/0176896 | A1 * | 7/2012 | Denman | 370/230.1 |
| 2012/0297083 | A1 * | 11/2012 | Ferguson et al. | 709/233 |
| 2013/0232249 | A1 * | 9/2013 | Weihl et al. | 709/223 |

OTHER PUBLICATIONS

N. Duffield, et al., "A Framework for Packet Selection and Reporting," Network Working Group, RFC 5474, 38 pages, Mar. 2009; http://www.ietf.org/rfc/rfc5474.txt.pdf.
T. Dietz, et al., "Information Model for Packet Sampling Exports," Network Working Group, RFC 5477, 46 pages, Mar. 2009; http://www.ietf.org/rfc/rfc5477.txt.pdf.

* cited by examiner

*Primary Examiner* — Afsar M Qureshi
(74) *Attorney, Agent, or Firm* — Patent Capital Group

(57) ABSTRACT

A method is provided in one example embodiment and includes receiving a packet flow from a data source at a network element; determining a control value for controlling a sample rate for the packet flow; and recalculating the control value based on a number of packets received and a number of sampled packets. In more particular embodiments, the method can include assigning a particular identifier to a particular packet of the packet flow; generating an input access control list for the data source; and matching the particular identifier to an output port of the network element. In yet other embodiments, the method can include generating a copy of a particular packet of the packet flow; and forwarding the copy of the particular packet to an output access control list based on an assigned quality of service (QoS) group.

18 Claims, 13 Drawing Sheets

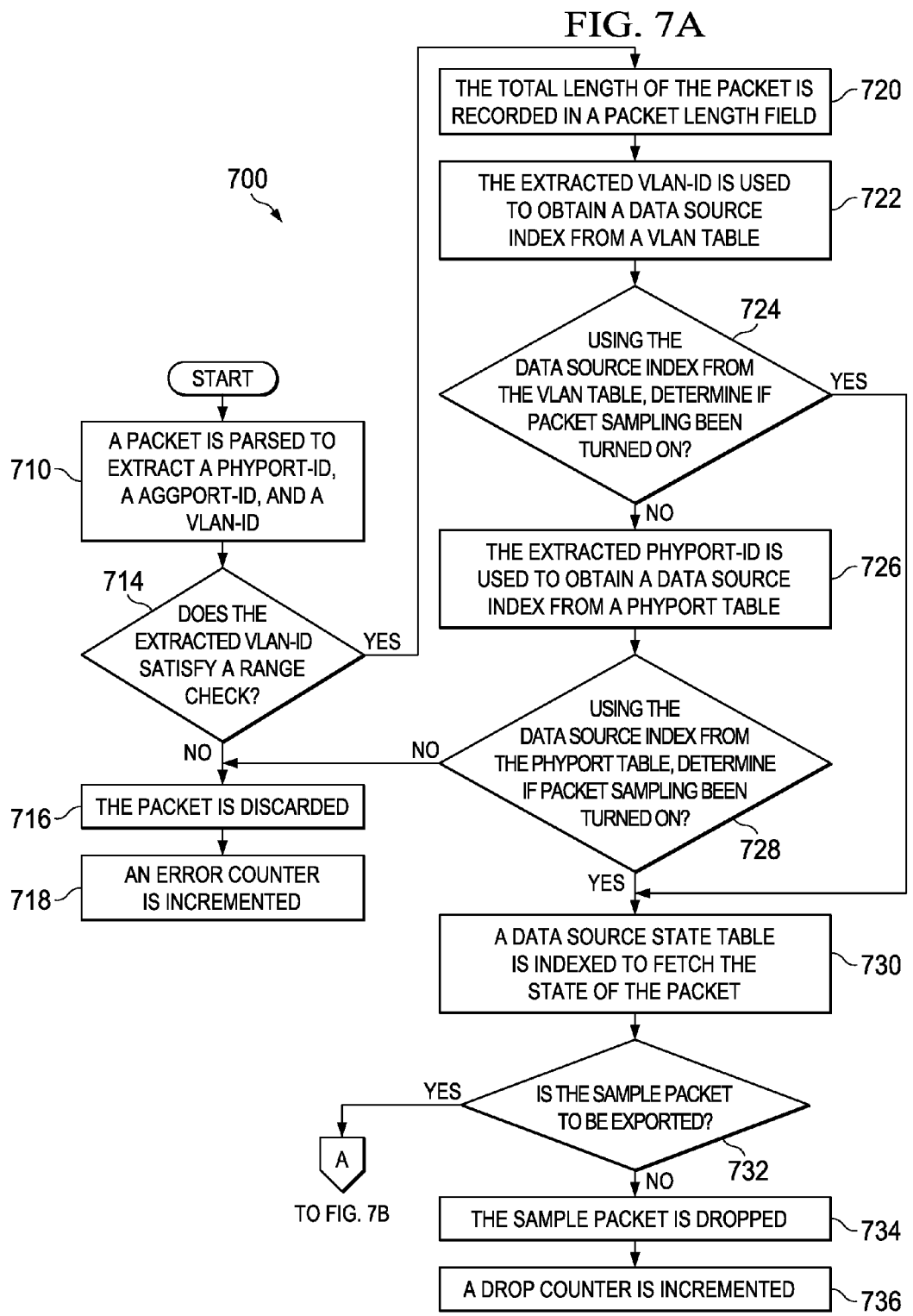

SYSTEM AND METHOD FOR PRODUCING DYNAMIC CREDIT UPDATES FOR TIME BASED PACKET SAMPLING

TECHNICAL FIELD

This disclosure relates in general to the field of communications and, more particularly, to a system and a method for providing dynamic credit updates for time based packet sampling.

BACKGROUND

End users have more media and communications choices than ever before. A number of prominent technological trends are currently underway (e.g., more computing devices, more online video services, more Internet video traffic) that are changing the data delivery landscape. As the bandwidth potential of computer networks grows, the traffic transmitted across networks grows as well. The increase in traffic often causes network congestion: resulting in the dropping of packets and the backing off of transfer rates.

In order to ensure efficient use of network resources, the network should be monitored to provide information regarding network traffic flow. Due to the high amount of network traffic, it is not practical to perform an analysis of all data packets transferred over a network (e.g., in order to better understand the traffic flows). One way to monitor network traffic flow is to perform a statistical analysis on a sample of data packets. However, there can be multiple ports receiving various sized data packets of various sizes and/or at different speeds, where ensuring the proper amount of sampling of the variations of data packets can be difficult.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 7A is another simplified flowchart illustrating potential operations associated with the communication system in accordance with an embodiment of the present disclosure;

DETAILED DESCRIPTION OF EXAMPLE EMBODIMENTS

Overview

A method is provided in one example embodiment and includes receiving a packet flow from a data source at a network element; determining a control value for controlling a sample rate for the packet flow; and recalculating the control value based on a number of packets received and a number of sampled packets. In more particular embodiments, the method can include assigning a particular identifier to a particular packet of the packet flow; generating an input access control list for the data source; and matching the particular identifier to an output port of the network element.

In yet other embodiments, the method can include generating a copy of a particular packet of the packet flow; and forwarding the copy of the particular packet to an output access control list based on an assigned quality of service (QoS) group. The control value can be recalculated based on a link rate of the data source and an average packet size of data packets received from the data source.

Other implementations can involve communicating the recalculated control value to a sampling processor based, at least, on data from an access control list being provided for the data source. In addition, the method can include recalculating the control value based on a rate at which statistics for an access control list are provided. The method can also include writing a calculated credit value for a particular packet flow to a next destination in response to access control list statistics being provided for the data source. In certain embodiments, the method can include provisioning a dynamic buffer limiting protocol to manage at least one queue associated with the network element, where a credit rate limiting scheme is applied for controlling a particular sample rate for a particular packet flow at the queue. At least one packet of the packet flow can be a multi-destination packet and a single copy of the multi-destination packet is created.

Example Embodiments

Figure 1A:
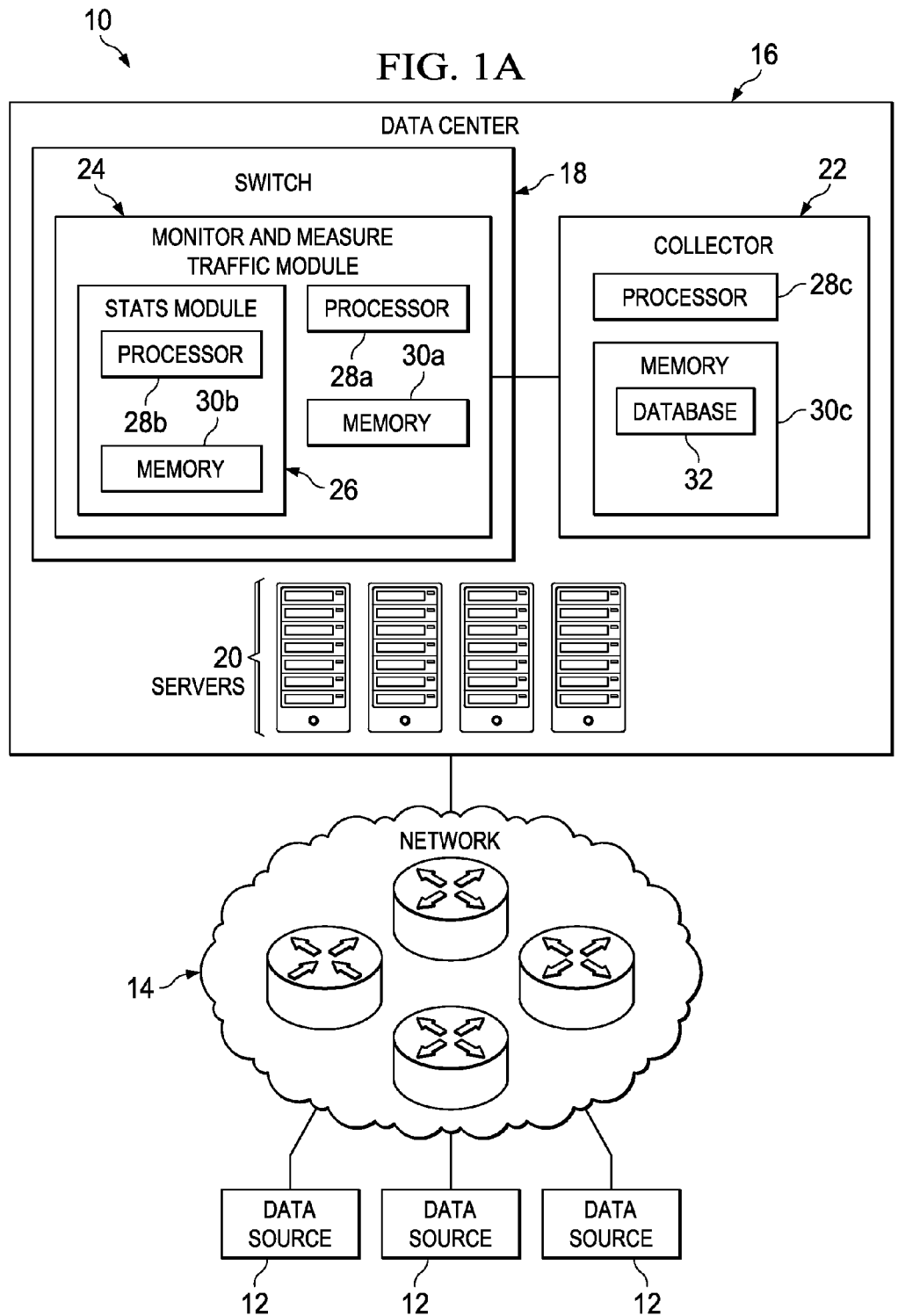
FIG. 1A is a simplified block diagram of a communication system for providing dynamic credit updates for time based packet sampling in a network environment in accordance with one embodiment of the present disclosure.

Turning to FIG. 1A, FIG. 1A is a simplified block diagram of a communication system 10 that is configured to use dynamic credit updates for a time-based packet sampling in accordance with one embodiment of the present disclosure. FIG. 1A includes a plurality of data sources 12, a network 14, and a data center 16. Data center 16 includes a plurality of servers 20, a switch 18, and a collector 22. Switch 18 includes a monitor and measure traffic module 24, which may include a statistics (stats) module 26, a processor 28a, and a memory 30a. Stats module 26 includes a processor 28b and a memory 30b. Collector 22 includes a processor 28c and a memory 30c. Memory 30c includes a database 32. In an embodiment, collector 22 may be configured to monitor and analyze data packets and, further, may capture data and store data in database 32 and/or facilitate the identification of content.

Communication system 10 may be configured to calculate a credit value required for programming a time based sampling system to achieve desirable packet sampling rates. Using monitor and measure traffic module 24, switch 18 can be configured to dynamically update credits in time based packet sampling. The credit value for credit updates to the time based sampler may be calculated per data source based on the link rate of the data source and the average packet size received on the data source. The calculated credit value may be written to monitor and measure traffic module 24 each time access control list (ACL) stats read data are returned for a data source. Hence, the credit rate can be tied to the rate at which ACL stats are collected.

Figure 1B:
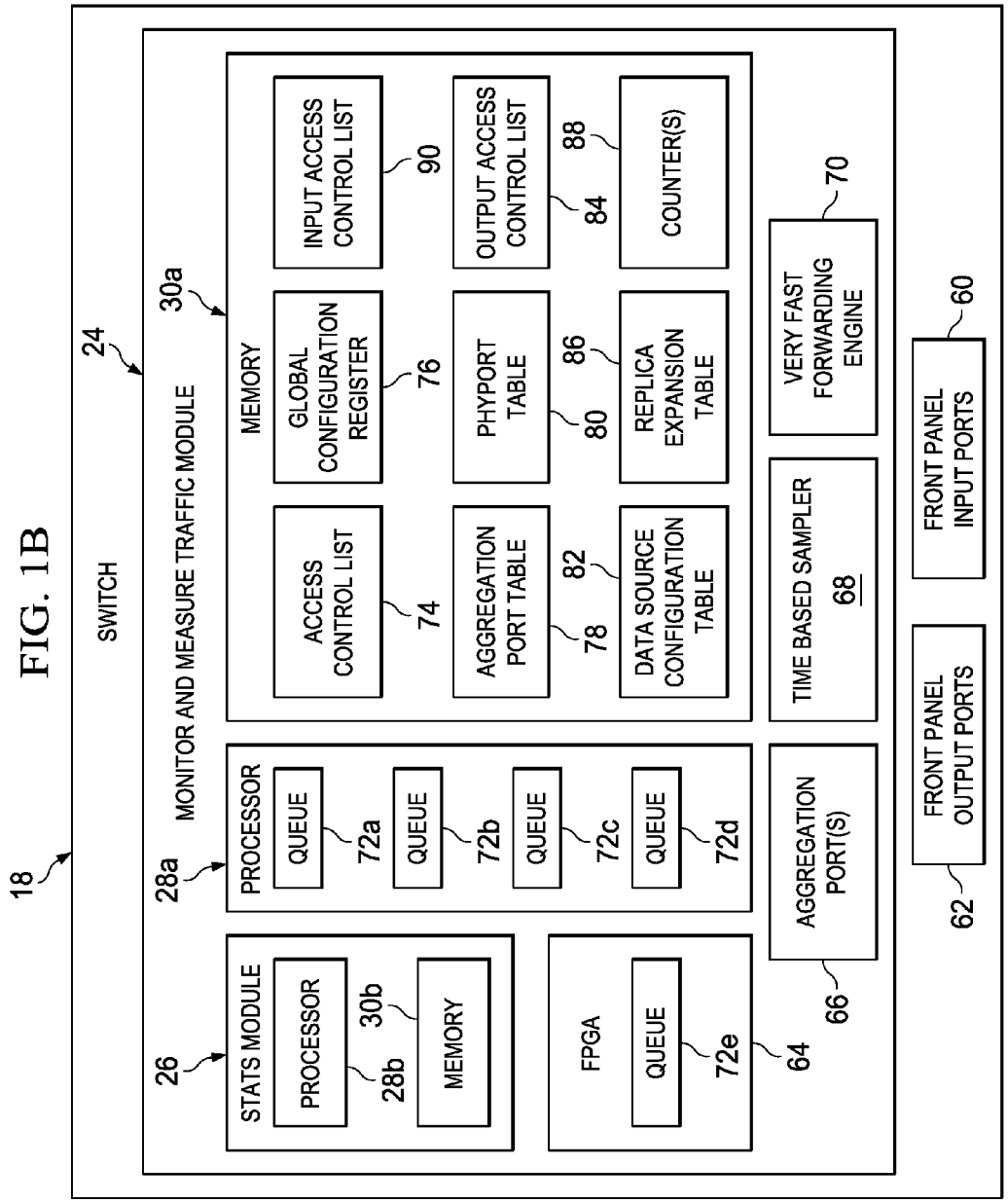
FIG. 1B is a simplified block diagram illustrating a switch of the communication system in accordance with one embodiment of the present disclosure.

Turning to FIG. 1B, FIG. 1B is a simplified block diagram illustrating possible example details associated with switch 18 that may be used in communication system 10. Switch 18 includes a plurality of front panel input ports 60, a plurality of front panel output ports 62, and monitor and measure traffic module 24. Monitor and measure traffic module 24 includes stats module 26, processor 28a, memory 30a, a field programmable gate array (FPGA) 64, an aggregation port (AGGPort) 66 (in an embodiment, there may be a plurality of AGGPorts 66), a time based sampler 68, and a very fast forwarding engine (VFFE) 70. Stats module 26 includes processor 28b and memory 30b; processor 28a includes queues 72a-d; and FPGA includes a queue 72e. Memory 30a includes an ACL 74, a global configuration register 76, an AGGPort table 78, a physical layer ports (phyports) table 80, a data source configuration (config) table 82, an output ACL 84, a replica expansion table 86, a counter 88 (in an embodiment, counter 88 may include more than one counter), and an input access control list 90.

For purposes of illustrating certain example techniques of communication system 10, it is important to understand the following foundational information that may be viewed as a basis from which the present disclosure may be properly explained. One issue with time based packet sampling can surface when a typical time based sampling mechanism is programmed with a static credit value and a credit update frequency that attempts to ensure the sampling rate is satisfied for a data source. For example, for a one (1) gigabyte (G) port, the credit value for sampling packets may be determined by dividing the packet rate by the desired sampling rate. More specifically, if the packet rate at sixty-four (64) bits on a one (1) G port is 1.488 Mpps, and the desired sampling rate is thirty-two (32) then the number of sampled packets in one second is 46,500 (i.e., $1.488*(10^6)/32=46,500$). Hence, the credit value (i.e., required number of sampled packets in one millisecond) is forty-seven (47) (i.e., 46,500 rounded up to 47,000). A credit update every one millisecond and a credit value of 47 can achieve 1-in-32 sampling for a 1G data source (assuming the correct packet size and full bandwidth on the link). However, a problem can result in oversampling for small packets when the bandwidth is lower than 1G and undersampling when the average packet size is larger than 1G.

In accordance with one example implementation of the present disclosure, in an effort to prevent oversampling for small packets and undersampling for larger packets, a dynamic credit value for credit updates may be calculated per-data source (e.g., based on the link rate of the data source and based on the average packet size received from the data source). The calculated credit value may be written to a sampling application specific integrated circuit (ASIC) (i.e., monitor and measure traffic module 24) each time ACL stats read data are returned for a data source. As a result, the credit update rate can be linked to the rate at which ACL stats are collected. This calculation can be supported for all data sources independent of whether a data source is a port, virtual LAN (VLAN), or etherchannel.

In one example, dynamic buffer limiting (DBL) may be used as an active queue management mechanism. As used herein, DBL is used to describe an event, where copies of packets from various monitored interfaces are generated and sent to a transmit queue at which a credit rate limiting scheme is applied. A rate DBL credit refresh can be performed by FPGA 64 (e.g., by Foretooine where Foretooine is a combination of both Forerunner and Tatooine logic commonly used in FPGAs). Traffic that flows from each data source can be isolated from each other because a DBL hash key will mask in an RxAGGPort-ID for port data sources and an RxVLAN-ID for VLAN data sources. Therefore, the flows from a given data source can hash into the same flow entry.

On an ingress data source, an identifier QoSGroup is assigned to the packet to indicate that the packet needs to be sampled. On front panel output ports 62, a sampling identifier is matched and a copy of the packet is generated and sent to AGGPort 66. AGGPort 66 acts as a proxy or alias for the original forwarded port. In an embodiment, separate AGGPorts 66 can be used to represent each possible front panel port 60. At AGGPort 66, ACL 74 is used to match all packets for a source and redirect them to processor 28a. This allows all sampled packets go to queues 72a-d in processor 28a with a replicaEventData identifier (which has the txAGGPort information encoded in it). The sampled packet's frame control header (FCH) contains an rxPhyport-ID that identifies front panel input ports 60 of the packet and txAGGPort-ID, which identifies a specific AGGPort 66 for the packet.

To determine the total number of packets seen by a sampler attached to a data source, an ACL accounting statIndex is associated with an input ACL for the data source. [Note that port interface statistics may not be relied on because, in the case of a stubbed port, port interface statistics are collected over a VLAN internetwork (VLI), which has an unacceptable delay in collecting statistics for packet sampling purposes.] The flow sample information may then be packaged (e.g., into a Netflow v9 datagram) and exported.

When generating a packet copy (e.g., for IPv4, IPv6 and L2 key types) that eventually is sampled, a ReplicaEventData format is generated that travels as part of the FCH with the sampled packet copy that is sent to FPGA 64. In an embodiment, an identifier is assigned to the packet. The assigned identifier may merge with any user applied QoS policies and there could be (P,V) entries as a result. Monitor and measure traffic module 24 may do a role based (RB) ACL match-all and assign an ACL accounting statsIndex. The statsIndex is used to keep count of all packets coming in from the datasource. A statsIndex counter (i.e., counter(s) 88) may represent a sample pool for the flow sample on the data source and allow separate stats accounting for each data source (the TCAM entries and labels cannot be shared).

In order to be able to sample a single input packet in the case of multi-destination packets, an additional copy for sampling purposes may be installed in all Level two/Level three (L2/L3) multicast forwarding entries and floodsets. The extra replica packet is forwarded to a reserved AGGPort 66 that represents all multi-destination packets, which will be sampled. Note that the reserved AGGPort 66 is used to represent multi-destination packets so that FPGA 64 can use a txAGGPort-ID to drive the setting of the multi-destination bit in the output port field in the flow sample.

In one example, a single internal multi-destination AGGPort 66 for floods or multicast may be used because multi-destination packets need not report an output port (e.g., ifIndex) in the flow sample record. For unknown destination floods, a reserved AGGPport 66 may be added as the first replica in the VLAN floodset RET entry. However, an extra replica for floods is not installed for a remote switched port analyzer (RSPAN) VLAN floodset. For a private VLAN (PV-LAN), when hopping VLANs, there can be special handling of the floodsets so as to suppress packet sampling copies from being generated when the VLAN changes.

In an embodiment, for protocol independent multicast (PIM) sparse and dense mode multicast entries, autoRxVlanBridging may be suppressed. The Rx VLAN ports may be explicitly set into a multicast replica expansion table (RET) entry because only a specific source is allowed to multicast to a specific group. In another embodiment, for Bidir PIM multicast entries, an rxVLANBridging behavior of the VFE may be necessary. Hence, installing an extra replica in the rxVLAN floodset may be sufficient.

In an embodiment, on the output side, front panel output port identifiers in ACLs 74 can be installed in a specified priority order. For example, if an open collaboration (OC) RBACL entry matches a multicast indication, then a higher priority may be permitted (i.e., no operation or no operation permitted (NOP)). In another example, if the OC RBACL entry matches a QoSGroup, then a copy of the packet may be sent to an internal alias AGGPort 66 and a VLANRule may be set to one (1). Similarly, if an OC RBACL L2 key matches a QoSGroup and macDa[40] is set to zero (0) (i.e., unicast indication), then a copy of the packet may be sent to an internal alias AGGPort 66 and the VLANRule may be set to one (1). In another example, if an OC RBACL IPv4/v6 key matches a multicast indication, then a higher priority than the next IP ACL may be permitted (i.e., basically NOP). Matching on multicast indication allows fewer ternary content-addressable memory (TCAM) entries to be consumed instead of expressing the match criteria as a QoSGroup ((QoSGroup==value) && unicast packet) for an IP packet.

Further, in another example, if an OC RBACL IPv4/v6 key matches a QoSGroup, then the packet may be copied to an internal alias AGGPort 66 and the VLANRule may be set to one (1). Similarly, if an OC RBACL OtherL3 key for MPLS packets matches a QoSGroup, then the packet may be copied to an internal alias AGGPort 66 and the VLANRule may be set to one (1). With MPLS packets, only bridged unicast, flood, or multicast packets are typically expected. Hence, the VLANRule may allow a single copy to be generated.

Note that the copy action is different for every output port in front panel output ports 62. The copy can go to a unique AGGPort 66 that is associated with an output front panel port in front panel output ports 62. Further, action table entries cannot be shared and, therefore, TCAM entries cannot be shared. As a result, labels cannot be shared. The output RBACLs are not installed for span destination ports.

In an embodiment, in OC, for every AGGPort 66 representing a specific front panel output port 60, the key is forced to L2. If OC RBACL matches a QoSGroup, then a packet copy may be redirected to queue 72a in processor 28a and the VLANRule may be set to one (1). The packet copy may carry AGGPort 66 in FCH.replicaEventData.txAGGPort-ID.

In a particular embodiment, for unknown destination floods in a VLAN, unicast packets hitting an output copy in ACL 74 attached to front panel output ports 62 and also hitting the output copy in ACL 74 on a reserved AGGPort 66 can cause an issue. For example, two (2) copies could be generated and sent to processor 28a for a flood packet. The two (2) copies can be reduced to a single copy by applying an output copy in ACL 74 on the reserved AGGPort 66 with the VLANRule set to one (1) to redirect the packets to processor 28a. With VLANRule set to one (1), only the first redirect or copy action encountered by a set of replicas in the same VLAN may be honored for a given input packet that may potentially hit many different ACLs 66 on different targets. The issue of two (2) copies being generated also arises with rxVLANBridging behavior associated with IP multicast and the issue is handled in the same manner as describe above.

In another embodiment, in OC for internal multi-destination AGGPorts 66, the key can be forced to be L2. For example, if OC RBACL matches a QoSGroup, then the packet can be redirected to queue 72a in processor 28a and the VLANRule may be set to one (1). The packet copy may carry the reserved internal multi-destination AGGPorts 66 in FCH.replicaEventData.txAGGPort-ID. In another example, if OC RBACL matches-all, then L2 can be denied. This allows for dropping copies of multi-destination packets whose first seen packet did not originate on a sample-enabled observation point. In an embodiment, a rate DBL hash key can mask in only the RxAGGPort-ID. DHM flow entries allocated to queues 72a-d in processor 28a may be periodically refreshed with credits by FPGA 64. This allows for the control of the number of packets selected for transmission to FPGA 64 during a refresh period.

One-in-one (1-in-1) sampling means every packet on the data source is to be exported. Such traffic may need to go to a processor queue that does not have rate DBL enabled. As a result, the copy generation approach described above may be used but with a different value for a QoSGroup (e.g., a QoS Group-ID N, where N is a number between 1 and 99). The QoSGroup may be used to identify traffic on the output port so that it can be directed to the appropriate processor queue.

In an embodiment, for ingress processing, the steps may be the same as 1-in-N described above, except that a different QoSGroup value assignment may be used. For example, if an IC QoS ACL matches-all, then the packet can be assigned to a QoSGroup2. Because of the different action, the TCAM entry and label cannot be shared with the QoS ACL used for a 1-in-N case.

In an embodiment, on the output side, for every front panel output port in front panel output ports 60, the handling for various key types is the same as 1-in-N, except that the match is done on QoSGroup2. For example, if an OC RBACL L2 key matches QoSGroup2 and unicast indication, then the packet can be copied to an internal alias AGGPort 66 and the VLANRule may be set to one (1). In another example, if an OC RBACL IPv4/v6 key matches a multicast indication and has a higher priority, then action can be permitted (i.e., NOP). In yet another example, if an OC RBACL IPv4/v6 key matches a QoSGroup2, then a copy of the packet can be sent to internal alias AGGPort 66 and the VLANRule may be set to one (1). Similarly, if an OC RBACL OtherL3 key for a MPLS packets matches a QoSGroup2, then a copy of the packet can be sent to internal alias AGGPort 66 and the VLANRule may be set to one (1). With multiprotocol label switching (MPLS), only bridged unicast, flood, or multicast packets are expected. Hence, the VLANRule typically allows only one copy to be generated.

In an embodiment, output ACLs 84 can be merged with the 1-in-N ACL 74 for a given front panel port and a common action may be shared. In OC, for every AGGPort 66 representing a front panel output port in front panel output ports 62, the key is forced to L2. For example, if an OC RBACL matches a QoSGroup2, then the packet can be redirected to queue 72*b* in processor 28*a* and the VLANRule may be set to one (1). This packet copy can carry AGGPort 66 in FCH.replicaEventData.txAGGPort-ID. The output ACL 84 action is distinct from a 1-in-N case and cannot be shared.

In another embodiment, in OC, for internal multi-destination AGGPorts 66, the key is always forced to be L2. For example, if an OC RBACL matches a QoSGroup, then L2 can be denied, the packet is redirected to queue 72*b* in processor 28*a* and the VLANRule may be set to one (1). The packet copy may carry the reserved internal multi-destination AGGPort 66 in FCH.replicaEventData.txAGGPort-ID. In addition, the output ACL 84 action is distinct from a 1-in-N case and cannot be shared. In another example, if an OC RBACL matches-all, then L2 is denied. This allows for drop copies of multi-destination packets whose first seen packet did not originate on a sample-enabled data source. In an embodiment, this can be shared with a 1-in-N case.

In another embodiment, VLANS can be spread across front panel input ports 60 and a given port may carry more than one VLAN. Therefore, the worst-case input rate on a VLAN should accommodate the possibility of all traffic arriving on one VLAN on a port. Hence, the worst-case input rate on a VLAN would be the sum of all front panel input ports 60 rates that carry the VLAN. If the rate DBL credit refresh is based on the sum of all front panel input port 60 rates, then the effective sampling rate realized in monitor and measure traffic module 24 may turn out to be overly aggressive and unnecessarily send packet copies to FPGA 64. Consequently, the FPGA may then enforce the sampling rate via sample elimination.

Further, the packet copy generation and sampling procedure continues to be the same as port based sampling, except that a different QoSGroup3 (e.g., 61) for VLAN data sources that are being sampled may be used. A different QoSGroup3 may be required to identify such VLAN data source copies on output ACL 74 and direct them to a different queue (e.g., a different queue from queues 72*a-d*). VLAN sampling can be turned ON for a given VLAN and port based sampling may also be enabled on the ports that carry the VLAN. Because the VLAN based sampling takes precedence, this allows packets belonging to the VLAN on a given port to be sampled under the VLAN observation point. A hash key in rate DBL used for VLAN sampled packet may be different from the one used for port based sampling because the hash key may be masked in RxVLAN-ID. As a result, a different queue (e.g., a different queue from queues 72*a-d*) from the one used for port based sampling may be required.

In one-in-one (1-in-1) sampling for VLANs, if the VLAN data source is carried on uplinks, then the amount of data on the VLAN could potentially be large; which could choke the link carrying sampled traffic going to FPGA 64. As a result, the packet copy generation and sampling procedure continues to be the same as port based sampling, except that QoS-Group2 may be used for VLAN traffic that is being one-in-one (1-in-1) sampled. In addition, the QoSGroup may be the same as the one used for port based one-in-one (1-in-1) sampling. VLAN data source copies on output ACL 84 may be identified and directed to queue 72*b* in processor 28*a* where rate DBL is not applied.

In an embodiment, queues 72*a-d* carrying sampled traffic to FPGA 64 are kept under one processor 28*a* subport. This allows traffic to be shaped to the worst-case committed rate (i.e., 1-in-32 on 50 ports and 1-in-1 on 2 downlink ports). This can prevent the sampled traffic going to FPGA 64 from choking off normal processor 28*a* bound traffic. With larger packet sizes (since the packet rate is lower and rate DBL credits can be configured (e.g., for sixty-four (64) B packets)), monitor and measure traffic module 24 may end up over sampling. As a result, increased bandwidth may be required on an IPP→FT link. The max rate allowed could be eight (8) G so that there are two (2) G left for other processor traffic. For example, port based 1-in-N sampling queue 72*a* may be shape-rate valued to eight (8) G, port or VLAN 1-in-1 sampling queue 72*b* may be shape-rate valued to two (2) G and VLAN based 1-in-N sampling queue 72*c* may be shape-rate valued to eight (8) G.

In an embodiment, redirecting the input packet copy to AGGPort 66 from an output classification may be done by specifying the required AGGPort 66 and processor subeventcode in a result from ACL 74. AGGPort 66 can represent a specific processor subport. A processor subeventcode, potentially along with a processor eventcode, may then determine the selection of a queue (e.g., selection of queues 72*a-d*) via a CPUEventFwdTable. An fwdResultOverrideEn bit may be set to one (1) in order to force selection of a processor subport and queue.

In another example, a sampled packet being transmitted to FPGA 64 via a specific processor 28*a* subport and queue may undergo a packet rewrite (e.g., using integrated performance primitives (IPP)). The rewrite itself can be selected from VFE as a global setting for replica packets going to processor 28*a*. The rewrite allows input marking to be performed on a replica packet going to processor 28*a*. Therefore, the sampled packet going to processor 28*a* is also going to be rewritten with input markings determined in VFE (which means the sampled packet is no longer the original ingress packet).

For purposes of packet sampling, the original packet headers in the exported packet sample may be reported. In one example, in order to prevent the input marking from being done on the sampled packet, a QoS policy may need to be installed on AGGPorts 66 that specifies a QoSCtrlIndex to disable a packet's cos/tos/exp bits from being modified. In another example, a global control for rewrite of replica packets to processor 28*a* may be changed to perform no input marking rewrite on the packet. With such a change, replica packets to any queue (not just processor 28*a* packet sampling queues) are affected. In one embodiment, a K5/K10 layer (K5 CpuMan) may need changes to perform input QoS classification on replica packets being received. As a result, the input QoS handling of both first seen and replica packets may become uniform in K5/K10.

In another embodiment, software forwarded packets and control packets may be captured by ingress processing in a CAT4k switch and forwarded to processor 28*a* for processing. Such packets may also need to be sampled. Packets forwarded to processor 28*a* can be distinguished from packets copied to processor 28*a* such that only the packet events of interest that are forwarded to processor 28*a* can be sampled.

Output ACL entries in output ACL 84 that are installed for every front panel port in front panel output ports 62 also generate a packet copy for sampling in the processing path. As a result, processing packet copy generation due to the output ACL entries can be suppressed. More specifically, when processor 28*a* receives forwarded packets from FPGA 64, the rxVLAN tag has been stripped off. As a result, the rxVLAN tag should be reinserted back into the packet copy. To reinsert the rxVLAN tag back into the packet copy, an encapsulation consisting of a destination MAC address (D-MAC), a source MAC address (S-MAC), and a reserved ethertype may be prepended to the packet copy, as illustrated in encapsulated packet sampling packet below.

```
Original packet
DMAC | SMAC | Ethertype | rxVlan tag | . . .
Encapsulated packet
Encap DMAC | Encap SMAC | Ethertype | 6 extra bytes |
Original packet | . . .
```

The SMAC may be chosen to represent the source port of the packet. The lower thirteen (13) bits of the SMAC may represent an RXPhyport-ID. Using RxProc format, the encapsulated packet can be fed to FPGA 64 in the appropriate sampled packet processor packet-sampling queue, depending on the kind of sampling required. The RxProc format may use L2 destination lookup to forward the packet to the packet sampling processor subport. A L2 destination forwarding entry can be created for the special D-MAC used in the reserved VLAN that yielded processor packet sampling subport as the forwarding result. (A default queue selected in processor 28*a* may be seven (7) under this subport.)

The processor-sampled packet can be re-injected in a special/reserved VLAN such that a D-MAC does not collide with learned MACs from external sources and is insulated from the learned MACs from a forwarding perspective. When VFE forwards the packet back to FPGA 64, it may appear on a queue (e.g., queues 72*a-d*) in processor 28*a* with an rxVLAN-ID that equals the special reserved VLAN. VFE 70 can tag the packet with a special reserved VLAN-ID when it forwards the packet to the subport in processor 28*a*.

In an embodiment, six (6) extra bytes may be added to the packet in order to provide an eight (8) byte multiple that can be stripped off (i.e., the encap length added is twenty (20) bytes). The six (6) extra bytes are used to pass the original L2 length of the packet to FPGA 64. As mentioned earlier, when VFE 70 forwards the RxProc packet to queue 72*e* in FPGA 64, queue 72*e* may insert a VLAN tag, which adds another four (4) bytes to the packet. Hence, the total length of the packet, now including the VLAN tag that FPGA 64 strips off, is twenty-four (24) bytes (which is a multiple of eight (8) bytes).

FPGA 64 can receive these packets in queue 72*e* (e.g., the packet is injected via FPGA 64 to IPP using DataRxProc format). The packet goes through VFE 70 and is then sent to a certain subport in processor 28*a* and a packet-sampling queue (i.e., default TxQ is 7). RateDbl is disabled on the packet-sampling queue for such packets in VFE 70 since this traffic is expected to be small and sample elimination in FPGA 64 can be used to provide sampling. FPGA 64 can identify such packets by an FCH.RXPhyport-ID. (The FCH.RXPhyport-ID should match the configured value in a CPUPhyport-ID InFch register.) FPGA 64 may use the lower thirteen (13) bits of the SMAC to determine input port instead of the usual FCH.rxPhyport-ID. FPGA 64 extracts the original L2 packet length from the two (2) bytes following the ethertype. (The remaining four (4) bytes of the encap are currently unused.) After stripping the 24 bytes, the original sampled packet is exposed and the original rxVLAN can be extracted from this exposed packet. The processing for packet sampling may be based on the original rxVLAN and extracted rxPhyport-ID as these can be used to index the data source configuration.

An alternative to using rate DBL is to use a packet rate policer on the packet copies. In this example, unique QoS-Groups are assigned on the input side to identify each data source. This allows the ability to match on the unique QoS-Groups at every AGGPort 66, apply a QoS Group value from ACL 74, and use a common shared packet rate policer for a given QoSGroup value.

Normal traffic switching through FPGA 64 takes priority over any input sampled packet datagram export. In an embodiment, a sampledflow datagram format uses the netflow v9 datagram format. FPGA 64 starts processing input sampled packets for packet sampling export only when software sets the global control packet samplingExportEn equal to one (1). FPGA 64 is configured to determine that a candidate-sampled packet has arrived for processing by virtue of the packet arriving with a certain processor 28*a* subport and queue number. A second global register nflowLiteInterceptEn indicates whether FPGA 64 should intercept packets and process them for sampling and export. In an embodiment, there may be four queues (e.g., queue 72*a-d*) dedicated for packet sampling purposes.

For example, queue 72*a* represents packets that are being sampled at a 1-in-N rate from port data sources. The handling of packets in queue 72*a* goes through a sample rate calculation to determine if they should be exported as a datagram or not. Queue 72*b* represents packets that are being sampled at a 1-in-1 rate from port or VLAN data sources. Packets in queue 72*b* are all exported. Further, queue 72*c* represents packets that are being sampled at a 1-in-N rate from VLAN data sources. The handling of packets in queue 72*c* goes through a sample rate calculation to determine if they should be exported as a datagram or not. Queue 72*d* represents processor bound packets, which were selected and re-injected to FPGA 64 for sampling and export.

VFE 70 can maintain ACL 74 accounting stats for every data source. The system may provide the starting address to a block of stats memory where ACL 74 accounting stats are maintained. Further, the mapping of each of those statistics entries to a particular data source may also be provided.

FPGA 64 may read the block of ACL 74 stats every T milliseconds, which defines a stats window Tw of length T. In an embodiment, the smaller the value of T the better the accuracy of the sampling pool that is reported with the flow sample. For example, a stats window of Tw<5 milliseconds (ms) may be required in order for flow sampling to be useful to monitor server microbursts. FPGA 64 may implement ACL 74 accounting stats collection period T, where T is the smallest possible value that will allow existing functionality without degradation.

In one example, rate DBL in VFE 70 performs a time based sampling, which may result in extra sampled packets sent to FPGA 64. The sampling of extra packets may occur because the credits and/or refresh frequency can over compensate for the rate of input traffic. Hence, the extra samples should be eliminated. Elimination may be done by determining the current sample rate on reception of a packet and comparing it with the configured sample rate on the data source. If the current sample rate is under the configured sampling rate, then the packet is exported. Otherwise the input packet sample can be dropped. In an alternative embodiment, the total number of packets that should have been seen at the data source is predicted. Then the total predicted number of packets is compared to a value (e.g., in a samplePool) to determine if the input packet should be exported. If the total predicted number of packets is below the value (e.g., below the value in the samplePOOL), then the packet can be exported. Otherwise the input packet sample can be dropped. FPGA 64 can maintain the number of samples it has exported in a sequenceNumber maintained per data source that is being sampled. FPGA 64 may also collect the number of packets seen by the data source to determine what samples to eliminate.

A credit value for credit updates can calculated per data source based on a link rate of the data source and the average packet size received on the data source. The calculation may be performed and the calculated credit value is written to VFE 70 each time ACL 74 stats read data are returned for a data source. Therefore, the credit update rate is tied to the rate at which ACL 74 stats are collected. This calculation can be supported for all data sources independent of whether a data source is a port, VLAN, or etherchannel. FPGA 64 may implement the following calculation for determining the credit value:

$$dblCredit=((linkRate*pktCount)/(byteCount+globallpg*pktCount))+baseDblCredit$$

The linkRate is the aggregate rate across all phyPorts in an etherchannel or VLAN data source. PktCount and byteCount are returned from reading ACL 74 stats for a given data source, globallpg is a global inter packet gap and baseDblCredit is a global bias that is added to the overall credit value calculated. Globallpg and baseDblCredit may be programmed in the global configuration register for DBL credit control. LinkRate is a per data source value stored in a tatDataSrcCfgTable.linkRate field in memory 30a. The units for this field may be bytes/statCollectionInterval. For example, if the statCollectionInterval is programmed to one (1) ms this field will be in units of bytes/ms. The tatDataSrcCfgTable.linkRate field can be thirty-two (32) bits wide to handle the worst-case link rate of eight-eight (88) G for VLANs. The value programmed in tatDataSrcCfgTable.linkRate can be adjusted to reflect the desired sample rate for the data source (e.g., 1 in 32 or 1 in 64). In one example, because the DHM credit register in VFE is only nine (9) bits wide, the calculated dblCredit value can be clamped at a maximum value of 511 since. The minimum credit value calculated may be rounded up to one since the VFE register does not support fractional credits.

A tatDataSrcCfgTable.useDefaultCreditValue field allows processor 28a to override FPGA 64 automatic determination of average packet size. When tatDataSrcCfgTable.useDefaultCreditValue is programmed to zero (0) FPGA 64 performs the average packet size calculation using byte and packet count from ACL 74 stats and tatDataSrcCfgTable.useDefaultCreditValue is programmed to one (1). In an embodiment, FPGA 64 may use defaultCreditValue field in data source configuration table 82 as the DBL credit value to refresh the DHM location for a given data source.

In an embodiment, processor 28a may have multiple cores. In order to take advantage of multiple receive packet queues and to take advantage of multiple processor cores in a server that can service these queues, the packet sample datagram export may round robin between a set of destination UDP port numbers. In an embodiment, FPGA 64 may have up to 16 UDP port numbers. The number of consecutive entries that are valid, starting with the first entry, are programmed into separate global register numCollectorDestUdpPorts that FPGA 64 can round robin and select for populating a UDP header of an export datagram. Hence, each export packet may therefore carry a destination UDP port number in a UDP header. For a given export packet the destination UDP port number may be different from the export packet preceding and succeeding it.

Turning to the example infrastructure associated with present disclosure, data sources 12 can be associated with devices, customers, or end users generating data or content in communication system 10 via some network. The term 'data source' is inclusive of devices used to initiate or create data, such as a receiver, a computer, a set-top box, an Internet radio device (IRD), a cell phone, a smart phone, a tablet, a personal digital assistant (PDA), a Google droid, an iPhone, and iPad, or any other device, component, element, or object capable of initiating voice, audio, video, media, or data exchanges within communication system 10. Data sources 12 may also be inclusive of a suitable interface to the human user, such as a display, a keyboard, a touchpad, a remote control, or other terminal equipment. Data sources 12 may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

Data center 16 is a facility used to house computer systems and associated components, such as telecommunications and storage systems. Data center 16 may contain a set of routers and switches that transport traffic between servers 20 and the outside world. Some servers 20 may be used for running basic Internet and intranet services needed by internal users in an organization, (e.g., e-mail servers, proxy servers, DNS servers, etc.).

Network 14 represents a series of points or nodes of interconnected communication paths for receiving and transmitting packets of information that propagate through communication system 10. Network 14 offers a communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment. Network 14 may implement a user datagram protocol (UDP)/IP connection and use a transmission control protocol/internet protocol (TCP/IP) communication language protocol in particular embodiments of the present disclosure. Further, network 14 may implement any other suitable communication protocol for transmitting and receiving data packets within communication system 10. Data, as used herein in this document, refers to any type of numeric, voice, video, media, or script data, or any type of source or object code, or any other suitable information in any appropriate format that may be communicated from one point to another.

In one particular instance, communication system 10 can be associated with a service provider digital subscriber line (DSL) deployment. In other examples, communication system 10 would be equally applicable to other communication environments, such as an enterprise wide area network (WAN) deployment, cable scenarios, broadband generally, fixed wireless instances, fiber to the x (FTTx), which is a generic term for any broadband network architecture that uses optical fiber in last-mile architectures. Communication system 10 may include a configuration capable of TCP/IP communications for the transmission and/or reception of packets in a network. Communication system 10 may also operate in conjunction with a UDP/IP or any other suitable protocol, where appropriate and based on particular needs.

Data center 16, switch 18, and/or collector 22 are network elements that can facilitate the dynamic credit update activities discussed herein. As used herein in this Specification, the term 'network element' is meant to encompass any of the aforementioned elements, as well as routers, switches, cable boxes, gateways, bridges, loadbalancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, data center 16, switch 18, and/or collector 22 include software to achieve (or to foster) the dynamic credit update activities discussed herein. This could include the implementation of instances of monitor and measure traffic module 24 and/or stats module 26. Additionally, each of these elements can have an internal structure (e.g., a processor, a memory element, etc.) to facilitate some of the operations described herein. In other embodiments, these dynamic credit update activities may be executed externally to these elements, or included in some other network element to achieve the intended functionality. Alternatively, data center 16, switch 18, and/or collector 22 may include software (or reciprocating software) that can coordinate with other network elements in order to achieve the dynamic credit update activities described herein. In still other embodiments, one or several devices may include any suitable algorithms, hardware, software, components, modules, interfaces, or objects that facilitate the operations thereof.

Figure 2:
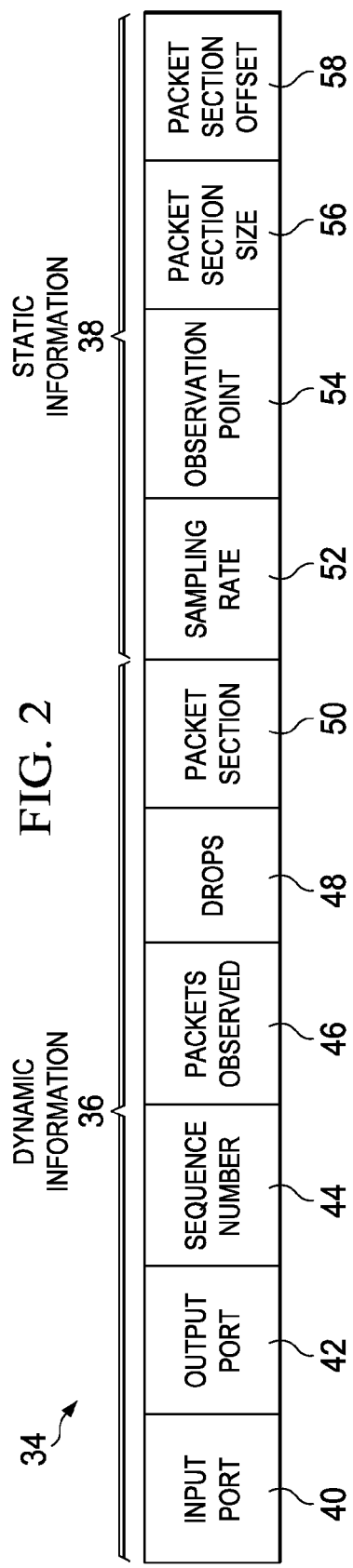
FIG. 2 is a simplified block diagram illustrating possible example details of a data packet associated with an embodiment of the present disclosure.

Turning to FIG. 2, FIG. 2 is a simplified block diagram illustrating one possible set of details associated with a packet 34 that may be used in communication system 10. FIG. 2 includes a dynamic information section 36 and a static information section 38. Dynamic information section 36 includes an input port field 40, an output port field 42, a sequence number field 44, a packets observed field 46, a drops field 48, and a packet section field 50. Static information section 38 includes a sampling rate field 52, an observation point field 54, a packet section size field 56, and a packet section offset 58.

In an embodiment, input port field 40 can contain an interface (i.e., port) that the packet came ingressed on and is represented as an interface index (ifIndex). Output port field 42 can contain an interface identifier (i.e., port identifier) on which the packet will egress (and may also be represented as an ifIndex). For multi-destination packets output port field 42 can be set to zero (0). Sequence number field 44 can represent a flow sample number that is incremented with each flow sample generated for a specific data source. Packets observed field 46 can represent the total number of packets that could have been sampled (e.g., packets skipped by sampling process+total number of samples). Drops field 48 can represent the number of times that a packet marked to be sampled was dropped due to lack of resources.

Packet section 50 can be X bytes of the sampled packet from a given offset from the start of the packet. In an embodiment, the number of bytes is configurable. The actual bytes that are extracted for the packet may be smaller than X, if the packet happens to be smaller than X. In such a case, the packet may be padded with zeroes up to the configured length (e.g., as in the case of version nine (V9) export records).

Sampling rate field 52 can be a packet-sampling rate configured on the data source. Observation point field 54 can be an ifIndex or virtual LAN identifier (VLAN-ID) representing a monitoring point. Packet section size field 56 can be the actual bytes that are extracted from the sampled packet for export. Typically, this may be the same as a user configured packet section size. Packet section offset field 58 can be the offset within the sampled packet from where the packet section was extracted.

Figure 3:
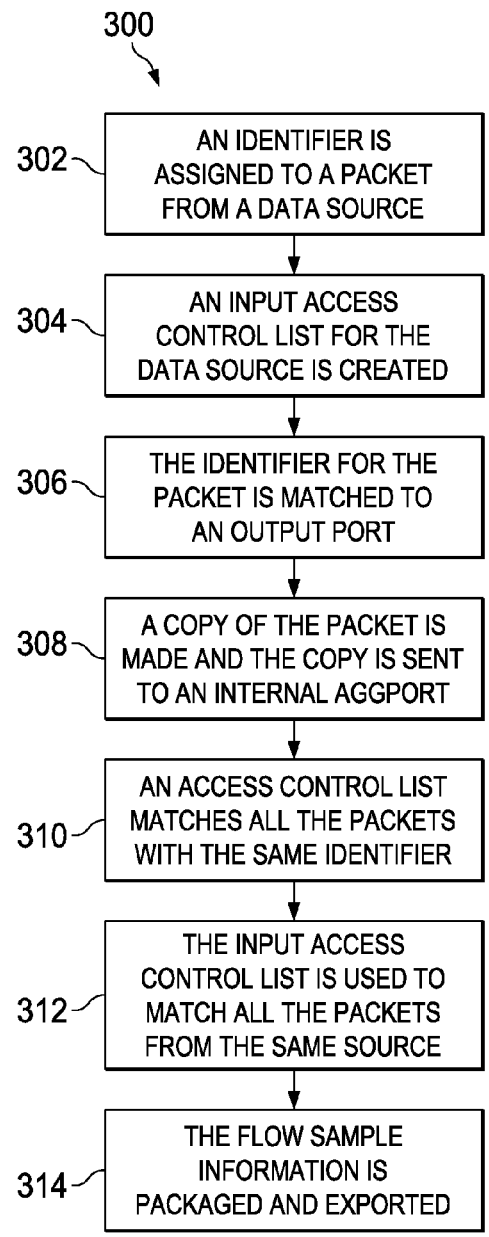
FIG. 3 is a simplified flowchart illustrating potential operations associated with the communication system in accordance with an embodiment of the present disclosure.

FIG. 3 is a simplified flowchart 300 illustrating example activities for providing dynamic credit updates for time based packet sampling. At 302, an identifier is assigned to packet from a data source. At 304, an input ACL for the data source is created. For example, an input ACL entry in ACL 74 may be created. At 306, the identifier for the packet is matched to an output port. At 308, a copy of the packet is made and the copy is sent to an internal AGGPort. For example, the copy of the packet may be sent to AGGPort 66. At 310, an ACL matches all the packets with the same identifier. At 312, the input ACL is used to match all the packets from the same source. At 314, flow sample information is packaged and exported. The flow sample information contains information about the packets from the same source. The information about the packets can be used to provide dynamic credit updates, for time based sampling.

Figure 4A:
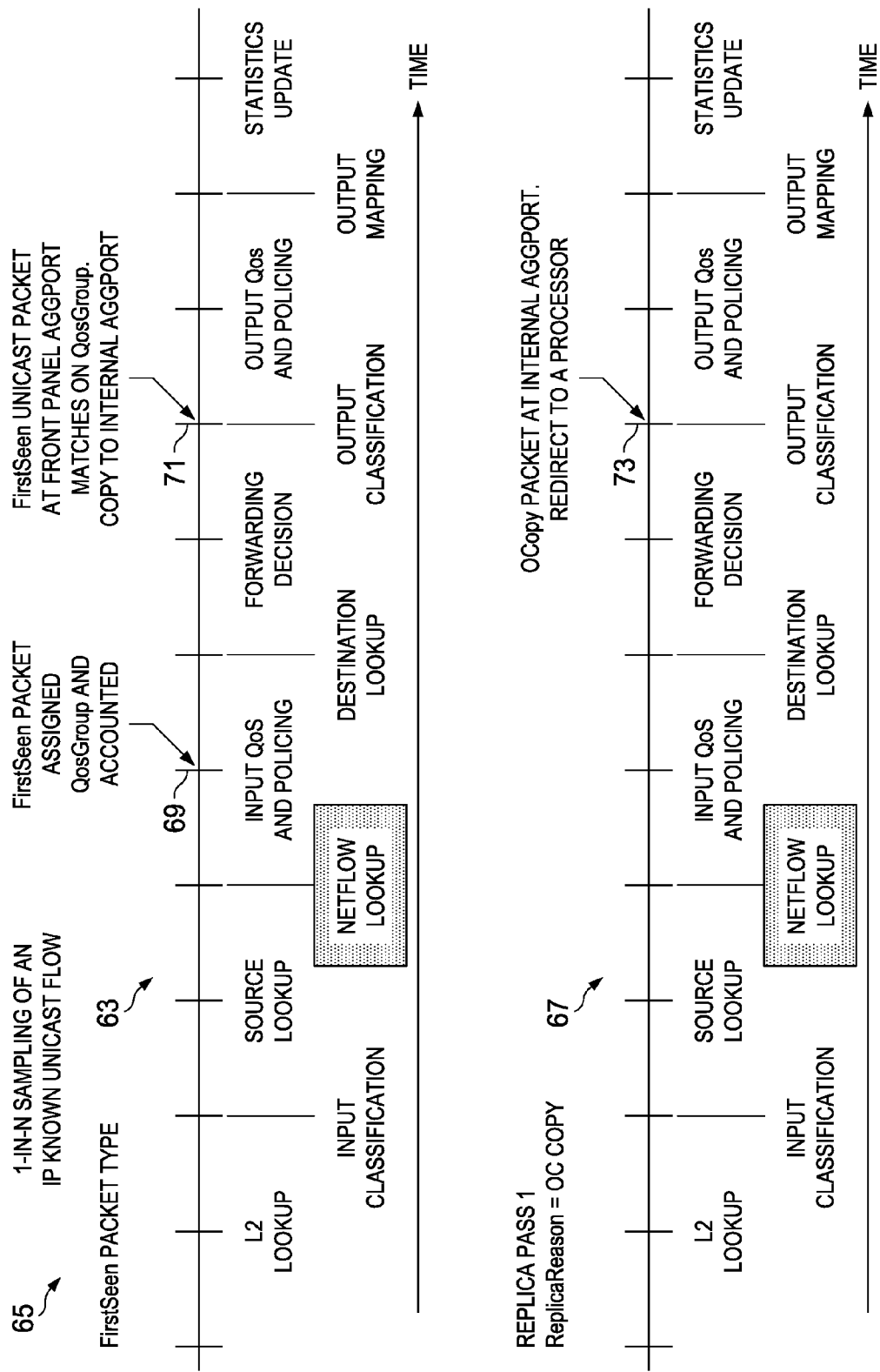
FIG. 4A is a simplified timeline diagram illustrating one potential operation associated with an embodiment of the present disclosure.

FIG. 4A is a simplified timeline diagram 65 illustrating a potential operation of a 1-in-N sampling of an IP known unicast flow associated with the present disclosure. FIG. 4A illustrates a first seen packet type timeline 63 and a replica pass timeline 67. As illustrated in first seen packet type timeline 63, a first seen packet type goes through L2 lookup, input classification, source lookup, and Netflow lookup. At input QoS and policing 69, a first seen unicast packet type from a source is assigned a packet QoS group and is accounted (i.e., packet is counted in an access control list accounting statistics entry). After a destination lookup for the packet and a forwarding decision is made, at output classification 71, the first seen unicast packet at a front panel AGGPort that matches the QoS group is copied to an internal AGGPort.

The path of a copy of the packet is illustrated in replica pass timeline 67. The replica packet goes through L2 lookup, input classification, source lookup, and Netflow lookup. Because the packet is a copy (or replica) of the first seen packet and has already been assigned a QoS group, the packet is not counted in the ACL accounting statistics entry. After a destination lookup for the packet and a forwarding decision is made at output classification 73, the copied packet is redirected to be inqueued at a processor (e.g., a processor 28a).

Figure 4B:
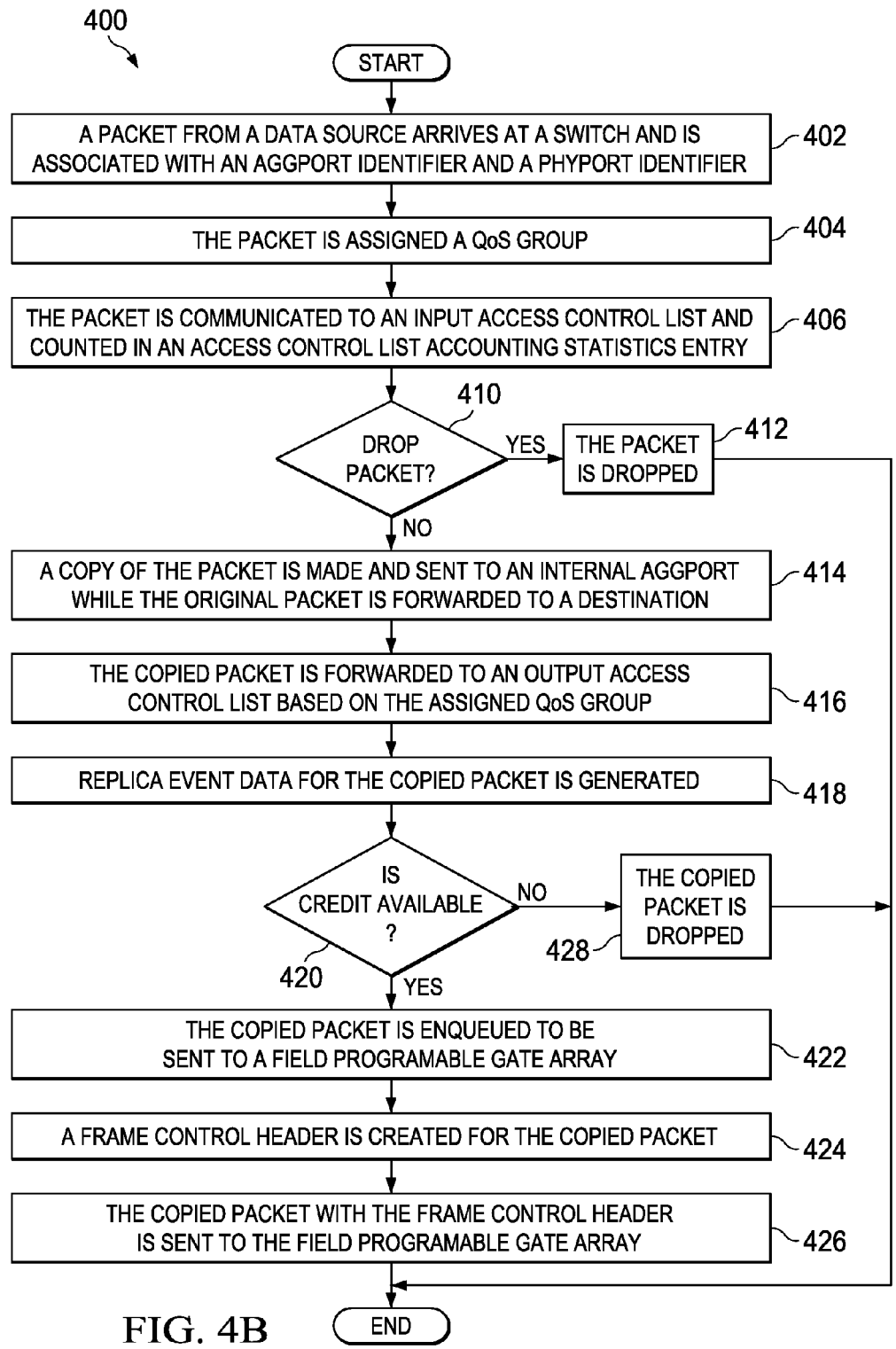
FIG. 4B is a simplified flowchart illustrating potential operations associated with the communication system in accordance with an embodiment of the present disclosure.

FIG. 4B is a simplified flowchart 400 illustrating example activities for providing dynamic credit updates for time based packet sampling. At 402, a packet from a data source arrives at a switch and is associated with an AGGPort-ID and a PHYPort-ID. At 404, the packet is assigned to a QoS group. At 406, the packet is communicated to an input ACL and counted in an ACL accounting stats entry. For example, the packet may be communicated to ACL 74 and counted in ACL accounting stats entry in counter(s) 88. At 410, the system determines if the packet should be dropped. If the packet should be dropped, then the packet is dropped, as in 412.

If the packet should not be dropped, then a copy of the packet is made and sent to an internal AGGPort while the original packet is forwarded to a destination, as in 414. For example, a copy of the packet may be sent to AGGPort 66. At 416, the copied packet is forwarded to an output ACL based on the assigned QoS group. For example, the copied packet may be forwarded to output ACL 84. At 418, replica event data for the copied packet is generated.

At 420, the system determines if credit is available. If credit is available, then the copied packet is enqueued to be sent to a FPGA, as in 422. For example, if credit is available, then the copied packet may be enqueued to be sent to FPGA 64. At 424, a frame control header is created for the copied packet. At 426, the copied packet with the frame control header is sent to the FPGA. For example, the copied packet with the frame control header may be sent to FPGA 64. If the system determines that a credit is not available, then the copied packet is dropped, as in 428.

Figure 5A:
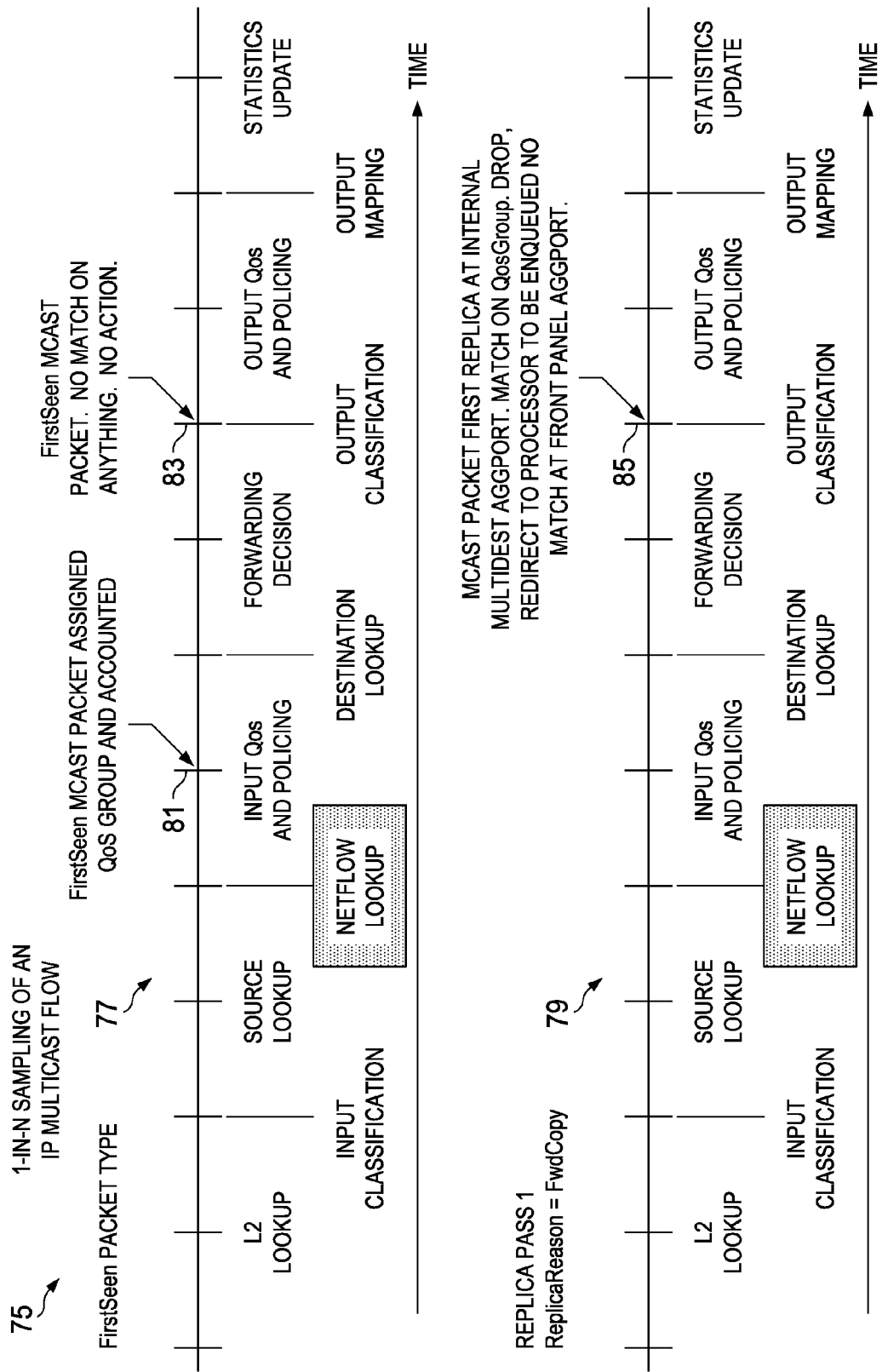
FIG. 5A is a simplified timeline diagram illustrating one potential operation associated with an embodiment of the present disclosure.

FIG. 5A is a simplified timeline diagram 75 illustrating a potential operation of a 1-in-N sampling IP multicast flow associated with the present disclosure. FIG. 5A illustrates a first seen packet type timeline 77 and a replica pass timeline 79. As illustrated in first seen packet type timeline 77, a first seen packet type goes through L2 lookup, input classification, source lookup, and Netflow lookup. At input QoS and policing 81, a first seen multicast packet is assigned a QoS group and is accounted (i.e., packet is counted in an ACL accounting statistics entry). At output classification 83, if the first seen multicast packet does not match any QoS group entries, then no action is taken, and the packet is allowed to continue being processed. The path of a copy of the packet is illustrated in the replica pass timeline. The replica packet goes through L2 lookup, input classification, source lookup, and Netflow lookup. Because the packet is a copy (or replica) of the first seen packet and has already been assigned a QoS group, the packet is not counted in the ACL accounting statistics entry. After a destination lookup for the packet and a forwarding decision is made at output classification 85, the multicast packet is first replicated at an internal multidestination AGGPort and a copy of the multicast packet is either dropped or redirected to be inqueued at a processor (e.g., processor 28a).

Figure 5B:
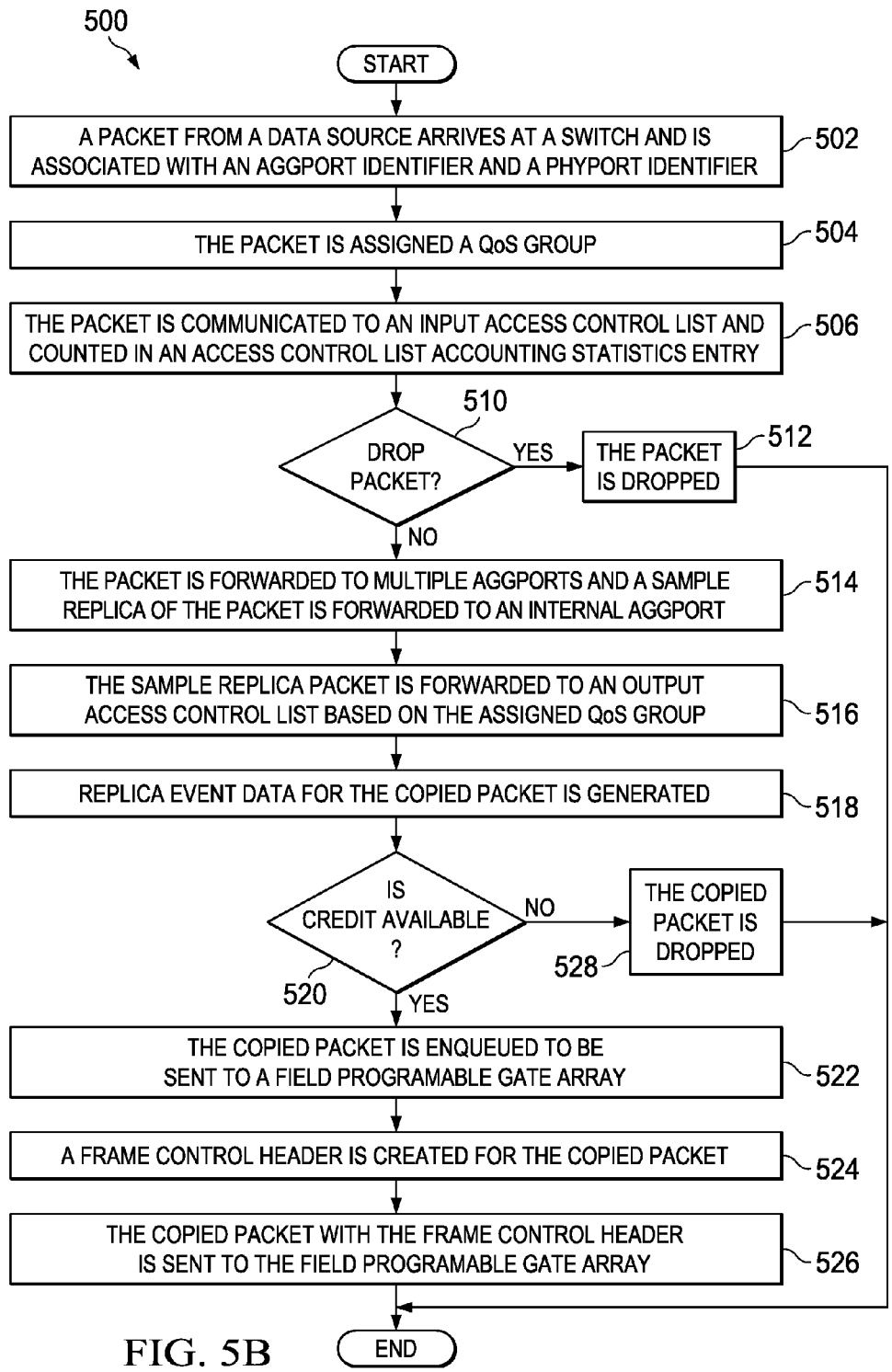
FIG. 5B is a simplified flowchart illustrating potential operations associated with the communication system in accordance with an embodiment of the present disclosure.

FIG. 5B is a simplified flowchart 500 illustrating example activities for providing dynamic credit updates for time based packet sampling. At 502, a packet from a data source arrives at a switch and is associated with an AGGPort-ID and a PHYPort-ID. At 504, the packet is assigned to a QoS group. At 506, the packet is communicated to an input ACL and counted in an ACL counting stats entry. For example, the packet may be communicated to ACL 74 and counted in an ACL counting stats entry in counter 88. At 510, the system determines if the packet should be dropped. If the packet should be dropped, then the packet is dropped, as in 512.

If the packet should not be dropped, then the packet is forwarded to multiple AGGPorts and a sample replica (i.e., copy) of the packet is forwarded to an internal AGGPort, as in 514. For example, the packet and a sample replica of the packet may be forwarded to AGGPort 66. At 516, the sample replica packet is forwarded to an output ACL based on the assigned QoS group. For example, the sample replica packet may be forwarded to output ACL 84. At 518, replica event data for the packet is generated.

At 520, the system determines if credit is available. If credit is available, then the copied packet (i.e., sample replica packet) is enqueued to be sent to a FPGA, as in 522. For example, if credit is available, then the copied packet may be enqueued to be sent to FPGA 64. At 524, a frame control header is created for the copied packet. At 526, the copied packet with the frame control header is sent to the FPGA. For example, the copied packet with the frame control header may be sent to FPGA 64. If the system determines that a credit is not available, then the copied packet is dropped, as in 528.

Figure 6A:
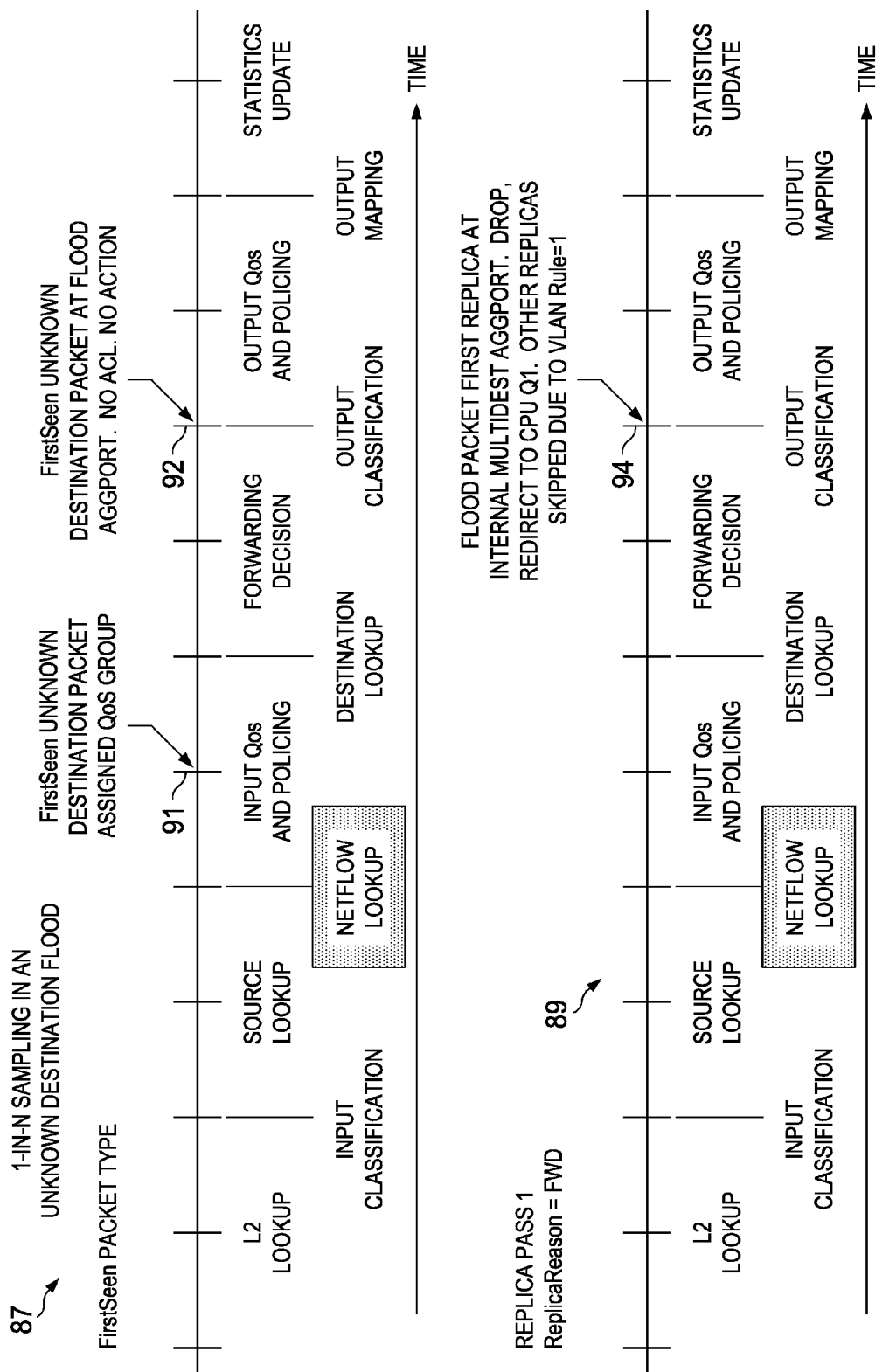
FIG. 6A is a simplified timeline diagram illustrating one potential operation associated with an embodiment of the present disclosure.

FIG. 6A is a simplified timeline diagram illustrating a potential operation of a 1-in-N sampling in an unknown destination flood associated with the present disclosure.

FIG. 6A illustrates a first seen packet type timeline 87 and a replica pass timeline 89. As illustrated in first seen packet type timeline 87, a first seen packet type goes through L2 lookup, input classification, source lookup, and Netflow lookup. At input QoS and policing 91, a first seen unknown packet is assigned a QoS group. After a destination lookup for the packet and a forwarding decision is made, then, at output classification 92, the first seen unknown packet is sent to AGGPort 66, and if the packet does not match an entry in an ACL, then the packet is allowed to continue being processed.

The path of a copy of the packet is illustrated in replica pass timeline 89. The replica packet goes through L2 lookup, input classification, source lookup, and Netflow lookup. Because the packet is a copy (or replica) of the first seen packet and has already been assigned a QoS group, the packet is not counted in the ACL accounting statistics entry. After a destination lookup for the packet and a forwarding decision is made at output classification 94, the flood packet is first replicated at an internal multidestination AGGPort 66 and a copy of the multicast packet is either redirected to be inqueued, dropped, or if the VLAN Rule is equal to one (1), then the packed is skipped.

Figure 6B:
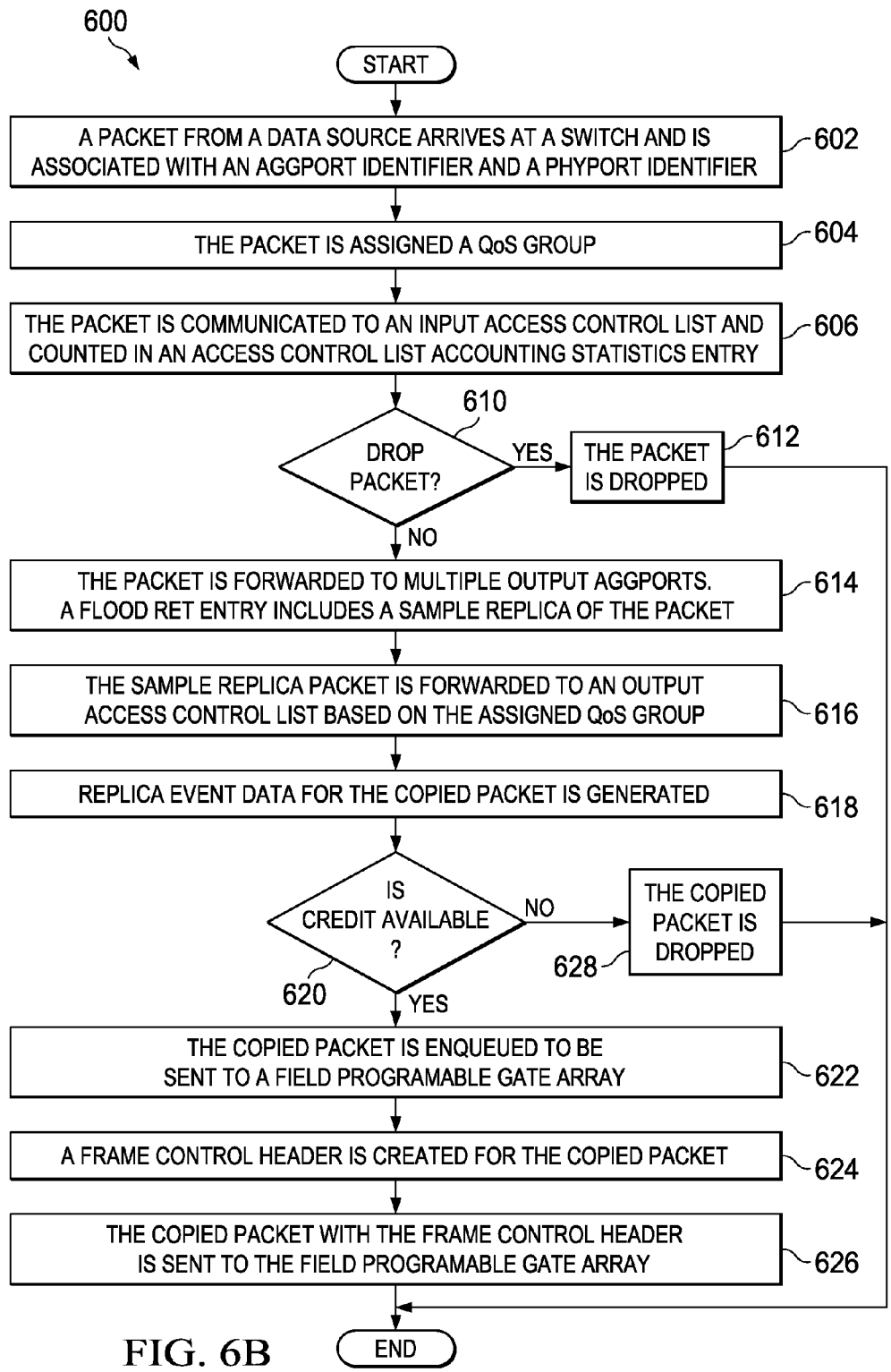
FIG. 6B is a simplified flowchart illustrating potential operations associated with the communication system in accordance with an embodiment of the present disclosure.

FIG. 6B is a simplified flowchart 600 illustrating example activities of dynamic credit update in time based packet sampling. At 602, a packet from the data source arrives at a switch and is associated with an AGGPort-ID and a PHYPort-ID. At 604, the packet is assigned to a QoS group. At 606, the packet is communicated to an input ACL and counted in an ACL accounting stats entry. For example, the packet may be communicated to ACL 74 and counted in an ACL accounting stats entry in counter 88. At 610, the system determines if the packet should be dropped.

If the packet should be dropped, then the packet is dropped, as in 612. If the packet should not be dropped, then the packet is forwarded to multiple output AGGPorts and a flood RET entry includes a sample replica (i.e., copy) of the packet, as in 614. For example, the packet may be forwarded to AGGPort 66 and a sample replica of the packet may be sent to RET 86. At 616, the sample replica packet is forwarded to an output ACL based on the assigned QoS group. For example, the sample replica packet may be forwarded to output ACL 84. At 618, replica event data for the copied packet is generated.

At 620, the system determines if credit is available. If credit is available, then the copied packet (i.e., sample replica packet) is enqueued to be sent to a FPGA, as in 622. For example, if credit is available, then the copied packet may be enqueued to be sent to FPGA 64. At 624, a frame control header is created for the copied packet. At 626, the copied packet with the frame control header is sent to the FPGA. For example, the copied packet with the frame control header may be sent to FPGA 64. If the system determines that a credit is not available, then the copied packet is dropped, as in 628.

Figure 7B:
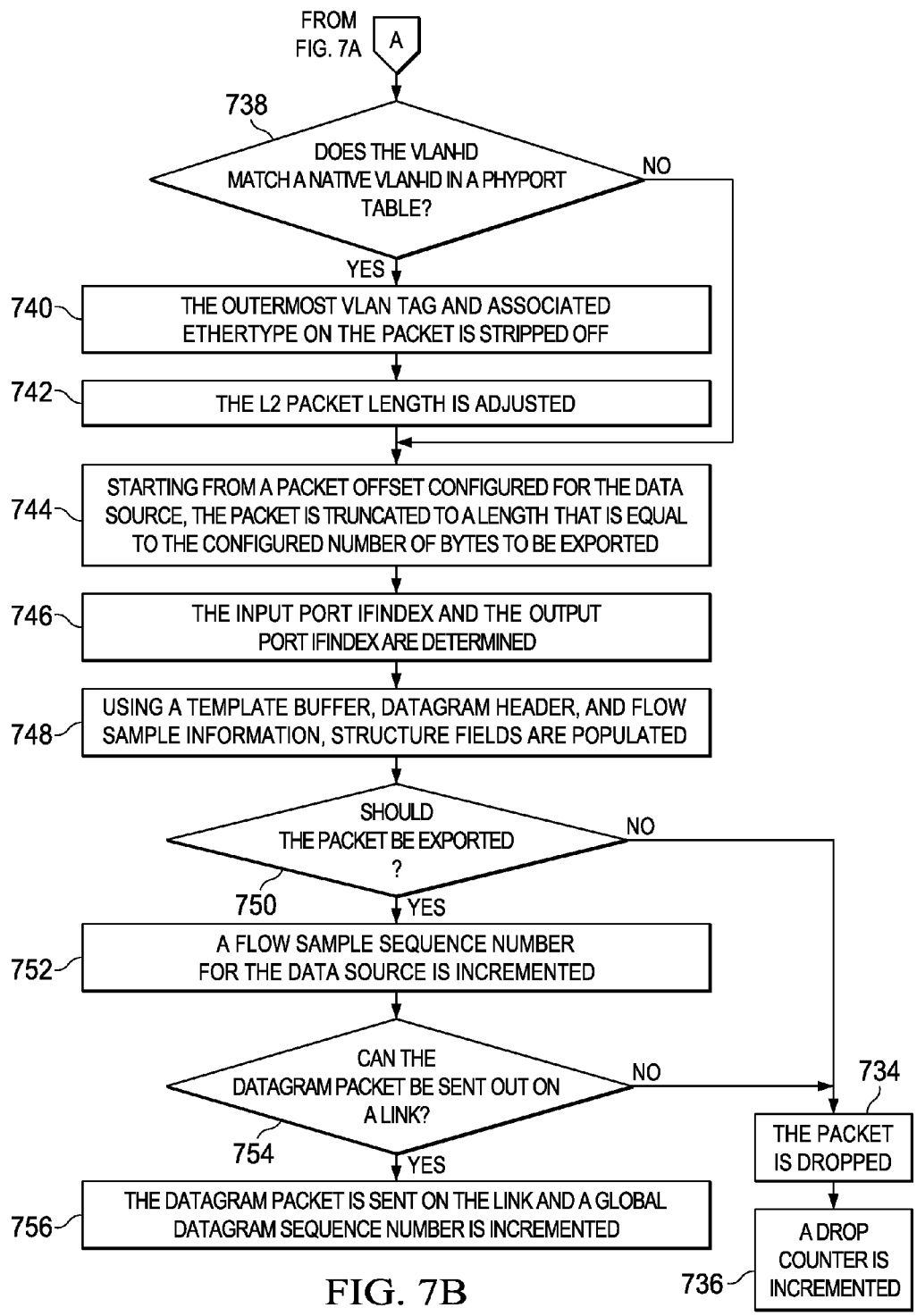
FIG. 7B is another simplified flowchart illustrating potential operations associated with the communication system in accordance with an embodiment of the present disclosure.

FIGS. 7A and 7B reflect a simplified flowchart 700 illustrating example activities for providing dynamic credit updates for time based packet sampling. In FIG. 7A, at 710, a packet is parsed to extract a PHYPort-ID, an AGGPort-ID, and a VLAN-ID. For example, FPGA 64 may parse a packet to extract a PHYPort-ID, an AGGPort-ID, and a VLAN-ID. At 714, the system determines if the extracted VLAN-ID satisfies a check range. For example, the check range may be between 1 and 1023 but depends on hardware limitations. If the extracted VLAN-ID does not satisfy a check range, then the packet is discarded, as in 716. At 718, an error counter is incremented. For example, an error counter in counter(s) 88 may be incremented.

If the extracted VLAN-ID satisfies a check range, then the total length of the packet is recorded in a packet length field, as in 720. At 722, the extracted VLAN-ID is used to obtain a data source index from a VLAN table. At 724, using the data source index from the VLAN table, the system determines if packet sampling has been turned on. If packet sampling has not been turned on, then the extracted PHYPort-ID is used to obtain a data source index from a PHYPort table, as in 726. For example, the extracted PHYPort-ID may be used to obtain a data source index from PHYPort table 80. At 728, using the data source index from the PHYPort table, the system determines if packet sampling has been turned on. If packet sampling has not been turned on, then the packet is discarded, as in 716.

If packet sampling has been turned on, then a data source state table is indexed to fetch the state of the packet, as in 730. Going back to 724, if packet sampling has been turned on, then a data source state table is indexed to fetch the state of the packet, as in 730. At 732, the system determines if the sample packet is to be exported (or alternatively eliminated).

In an embodiment, the system can determine if the packet should be exported or eliminated by determining the current sample rate on reception of a packet and comparing it with the configured sample rate on the data source. If the current sample rate is under the configured sampling rate, the packet is exported. Otherwise, the input packet sample is eliminated or dropped. If the sampled packet is not to be exported (i.e., is to be eliminated), then the sampled packet is dropped, as in 734. At 736, a drop counter is incremented. For example, a drop counter in counter 88 may be incremented.

If the sample packet is to be exported, then the system determines if the VLAN-ID matches a native VLAN-ID in a PHYPort table, as in 738, illustrated in FIG. 7B. If the VLAN-ID matches a native VLAN-ID in a PHYPort table, then the outermost VLAN tag and associated ethertype on the packet is stripped off, as in 740. Ethertype is a two-octet field in an ethernet frame and is used to indicate which protocol is encapsulated in the payload of an ethernet frame. At 742, the L2 packet length is adjusted. At 744, starting from a packet offset configured for the data source, the packet is truncated to a length that is equal to the configured number of bytes to be exported. If the VLAN-ID does not match a native VLAN-ID in a PHYPort table, then starting from the packet offset configured for the data source the packet is truncated to a length that is equal to the configured number of bytes to be exported, as in 744.

At 746, the input port IFINDEX and the output port IFINDEX are determined. For example, the system may use the PHYPort table and the dataSourceConfig table to find the input port IFINDEX and use the AGGport table and the dataSourceConfig table to find the output port IFINDEX. At 748, using a template buffer, datagram header, and flow sample information, structure fields are populated. In an embodiment, the template buffer has L2, IP, UDP, packet-sampling headers constructed and only a Netflow v9 datagram header and flow sample information structure fields may need to be populated or altered. At 750, the system determines if the packet should be exported. If the packet should not be exported, then the packet is dropped as in 734. At 736, a drop counter is incremented. For example, a drop counter in counter(s) 88 may be incremented. In an embodiment, the drop counter is reported in a packet sample report for the data source/observation point.

If the packet should be exported, then a flow sample sequence number for the data source is incremented, as in 752. At 754, the system determines if the datagram packet can be sent out on a link. If the datagram packet cannot be sent out on the link (e.g., due to congestion), then the packet is dropped, as in 734. If the datagram packet can be sent out on the link, then the datagram packet is sent on the link and a global datagram sequence number is incremented, as in 756. For example, a global datagram sequence number in counter 88 may be incremented.

In an embodiment, a global running sequence number may be maintained for every datagram exported. The global datagram sequence number is incremented only if the packet is actually sent out on the link to IPP (similar to the per data source sequence number). The global and per data source sequence number values are used to populate the respective fields in a Netflow datagram.

Figure 8:
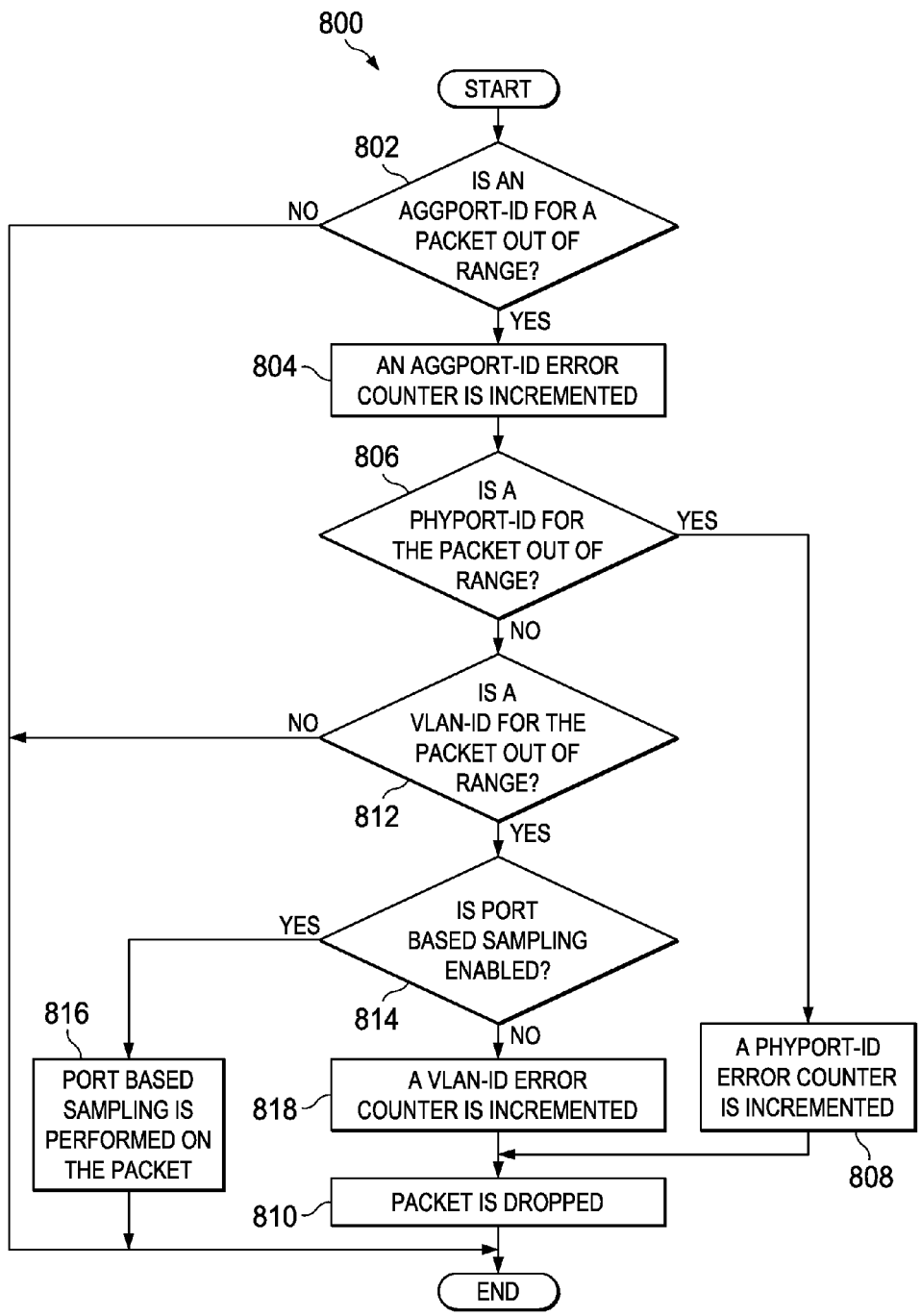
FIG. 8 is another simplified flowchart illustrating potential operations associated with the communication system in accordance with an embodiment of the present disclosure.

FIG. 8 is a simplified flowchart 800 illustrating example activities for providing dynamic credit updates for time based packet sampling. At 802, the system determines if an AGGPort-ID is out of range. If the AGGPort-ID is not out of range, then nothing is done. If the AGGPort-ID is out of range, then an AGGPort-ID error counter is incremented, as in 804. In 806, the system determines if a PHYPort-ID is out of range. If the PHYPort-ID is out of range, then a PHYPort-ID error counter is incremented, as in 808. At 810, the packet is dropped.

If the PHYPort-ID is not out of range, then the system determines if a VLAN-ID is out of range, as in 812. If the VLAN-ID is not out of range, then nothing is done. If the VLAN-ID is out of range, then the system determines if port sampling is enabled, as in 814. If port sampling is enabled, then port based sampling is performed on the packet, as in 816. If port sampling is not enabled, then a VLAN error counter is incremented, as in 818. At 810, the packet is dropped.

As identified previously, a network element can include software (e.g., a software instance of collector 22, monitor and measure traffic module 24, stats module 26, etc.) to achieve the dynamic credit update operations, as outlined herein in this document. In certain example implementations, the dynamic credit update functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor [processors 28*a*, 28*b*, and 28*c* shown in FIGS. 1A and 1B], or other similar machine, etc.). In some of these instances, a memory element [memory 30*a*, 30*b*, and 30*c* shown in FIGS. 1A and 1B] can store data used for the operations described herein. This includes the memory element being able to store instructions (e.g., software, code, etc.) that are executed to carry out the activities described in this Specification. The processor (e.g., processors 28*a*, 28*b*, and 28*c*) can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the caching of data streams as outlined herein. Additionally, each of these devices may include a processor that can execute software or an algorithm to perform the caching management activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and, further, can accommodate a large number of components, as well as more complicated/sophisticated arrangements and configurations. Accordingly, the examples provided should not limit the scope or inhibit the broad teachings of communication system 10, as potentially applied to a myriad of other architectures.

It is also important to note that the steps in the preceding FIGURES illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving a packet flow from a data source at a network element;
   determining a control value for controlling a sample rate for the packet flow; and
   recalculating the control value based on a number of packets received and a number of sampled packets; and
   provisioning a dynamic buffer limiting protocol to manage at least one queue associated with the network element, wherein a credit rate limiting scheme is applied for controlling a particular sample rate for a particular packet flow at the queue.

2. The method of claim 1, further comprising:
   assigning a particular identifier to a particular packet of the packet flow;
   generating an input access control list for the data source; and
   matching the particular identifier to an output port of the network element.

3. The method of claim 1, further comprising:
   generating a copy of a particular packet of the packet flow; and
   forwarding the copy of the particular packet to an output access control list based on an assigned quality of service (QoS) group.

4. The method of claim 1, wherein the control value is recalculated based on a link rate of the data source and an average packet size of data packets received from the data source.

5. The method of claim 1, further comprising:
   communicating the recalculated control value to a sampling processor based, at least, on data from an access control list being provided for the data source.

6. The method of claim 1, further comprising:
   recalculating the control value based on a rate at which statistics for an access control list are provided.

7. The method of claim 1, further comprising:
   writing a calculated credit value for a particular packet flow to a next destination in response to access control list statistics being provided for the data source.

8. The method of claim 1, wherein at least one packet of the packet flow is a multi-destination packet and a single copy of the multi-destination packet is created.

9. Logic encoded in non-transitory media that includes instructions for execution and when executed by a processor, is operable to perform operations, comprising:
   receiving a packet flow from a data source at a network element;
   determining a control value for controlling a sample rate for the packet flow; and
   recalculating the control value based on a number of packets received and a number of sampled packets; and
   provisioning a dynamic buffer limiting protocol to manage at least one queue associated with the network element, wherein a credit rate limiting scheme is applied for controlling a particular sample rate for a particular packet flow at the queue.

10. The logic of claim 9, the operations further comprising:
    assigning a particular identifier to a particular packet of the packet flow;
    generating an input access control list for the data source; and
    matching the particular identifier to an output port of the network element.

11. The logic of claim 9, the operations further comprising:
    generating a copy of a particular packet of the packet flow; and
    forwarding the copy of the particular packet to an output access control list based on an assigned quality of service (QoS) group.

12. The logic of claim 9, wherein the control value is recalculated based on a link rate of the data source and an average packet size of data packets received from the data source.

13. The logic of claim 9, the operations further comprising:
    communicating the recalculated control value to a sampling processor based, at least, on data from an access control list being provided for the data source.

14. The logic of claim 9, the operations further comprising:
recalculating the control value based on a rate at which statistics for an access control list are provided.

15. The logic of claim 9, wherein at least one packet of the packet flow is a multi-destination packet and a single copy of the multi-destination packet is created.

16. A network element, comprising:
a statistics module;
a memory element for storing instructions; and
a processor coupled to the memory element and operable to execute the instructions such that the network element is configured for:
receiving a packet flow from a data source;
determining a control value for controlling a sample rate for the packet flow; and
recalculating the control value based on a number of packets received and a number of sampled packets; and
provisioning a dynamic buffer limiting protocol to manage at least one queue associated with the network element, wherein a credit rate limiting scheme is applied for controlling a particular sample rate for a particular packet flow at the queue.

17. The network element of claim 16, wherein the network element is further configured for:
assigning a particular identifier to a particular packet of the packet flow;
generating an input access control list for the data source; and
matching the particular identifier to an output port of the network element.

18. The network element of claim 16, wherein the control value is recalculated based on a link rate of the data source and an average packet size of data packets received from the data source.

* * * * *